(12) United States Patent
Pacheco et al.

(10) Patent No.: US 9,443,185 B2
(45) Date of Patent: Sep. 13, 2016

(54) RUGGED RFID TAGS

(71) Applicant: VALLOUREC OIL AND GAS FRANCE, Aulnoye-Aymeries (FR)

(72) Inventors: Daniel Pacheco, Crosby, TX (US); R. Clayton Smith, Boulder, CO (US)

(73) Assignee: VALLOUREC OIL AND GAS FRANCE, Aulnoye-Aymeries (FR)

( * ) Notice: Subject to any disclaimer, the term of this patent is extended or adjusted under 35 U.S.C. 154(b) by 100 days.

(21) Appl. No.: 13/871,786

(22) Filed: Apr. 26, 2013

(65) Prior Publication Data

US 2013/0285829 A1 Oct. 31, 2013

Related U.S. Application Data

(60) Provisional application No. 61/639,430, filed on Apr. 27, 2012.

(51) Int. Cl.
*G06K 19/077* (2006.01)
*E21B 47/12* (2012.01)
*E21B 47/09* (2012.01)

(52) U.S. Cl.
CPC ..... *G06K 19/07749* (2013.01); *E21B 47/0905* (2013.01); *E21B 47/12* (2013.01); *G06K 19/0773* (2013.01); *G06K 19/07728* (2013.01)

(58) Field of Classification Search
USPC ........... 340/854.6, 854.1; 235/492, 385, 488, 235/487
See application file for complete search history.

(56) References Cited

U.S. PATENT DOCUMENTS

| 5,142,128 | A | * | 8/1992 | Perkin et al. | 235/375 |
|---|---|---|---|---|---|
| 5,202,680 | A | * | 4/1993 | Savage | 340/853.1 |
| 5,964,656 | A | * | 10/1999 | Lawler et al. | 452/173 |
| 6,288,905 | B1 | * | 9/2001 | Chung | 361/771 |
| 8,608,080 | B2 | * | 12/2013 | Finn | 235/492 |
| 2002/0031997 | A1 | * | 3/2002 | Lawler et al. | 452/173 |
| 2003/0156033 | A1 | * | 8/2003 | Savage et al. | 340/572.8 |
| 2003/0188966 | A1 | * | 10/2003 | Katayama | 204/297.14 |
| 2003/0192695 | A1 | * | 10/2003 | Dillenbeck et al. | 166/285 |
| 2005/0234471 | A1 | * | 10/2005 | Cordes et al. | 606/117 |
| 2006/0112834 | A1 | * | 6/2006 | Imura | 99/342 |
| 2007/0096920 | A1 | * | 5/2007 | Cargonja et al. | 340/572.8 |
| 2008/0165011 | A1 | * | 7/2008 | Staff | 340/572.7 |
| 2009/0121895 | A1 | * | 5/2009 | Denny et al. | 340/854.1 |
| 2009/0132158 | A1 | * | 5/2009 | Sironi et al. | 701/200 |
| 2009/0283595 | A1 | * | 11/2009 | White et al. | 235/385 |
| 2009/0315320 | A1 | * | 12/2009 | Finn | 283/107 |
| 2011/0011224 | A1 | * | 1/2011 | Levene | 83/13 |
| 2011/0023289 | A1 | * | 2/2011 | Finn | 29/601 |
| 2011/0199187 | A1 | | 8/2011 | Davidowitz | |
| 2011/0203144 | A1 | * | 8/2011 | Junek et al. | 40/300 |
| 2011/0253793 | A1 | | 10/2011 | King | |
| 2012/0012393 | A1 | * | 1/2012 | Kumar | 175/58 |
| 2012/0018524 | A1 | * | 1/2012 | Loi et al. | 235/492 |
| 2012/0091209 | A1 | * | 4/2012 | Hotaling et al. | 235/488 |
| 2013/0285829 | A1 | * | 10/2013 | Pacheco et al. | 340/854.6 |
| 2014/0110474 | A1 | * | 4/2014 | Koliyot | 235/376 |

OTHER PUBLICATIONS

Supplementary European Search Report issued Jan. 25, 2016 in Patent Application No. 13 78 1826.

* cited by examiner

*Primary Examiner* — Fekadeselassie Girma
(74) *Attorney, Agent, or Firm* — Oblon, McClelland, Maier & Neustadt, L.L.P

(57) ABSTRACT

A rugged UHF RFID tag comprising a UHF RFID tag, an overmolded cap, and a base, wherein the UHF RFID tag is secured to a top portion of the base and wherein the overmolded cap encapsulates the UHF RFID tag and the top portion of the base and associated methods.

19 Claims, 9 Drawing Sheets

RUGGED RFID TAGS

CROSS-REFERENCE TO RELATED APPLICATION

This application is based upon and claims the benefit of priority from U.S. Provisional Application No. 61/639,430, filed on Apr. 27, 2012, the entire contents of which are incorporated herein by reference.

BACKGROUND

Radio-frequency identification (RFID) is the use of a wireless non-contact system that uses radio-frequency electromagnetic fields to transfer data from an RFID tag attached to an object, for the purposes of automatic identification and tracking. Some RFID tags require no battery and are powered by the electromagnetic fields used to read them. Others use a local power source and emit radio waves (electromagnetic radiation at radio frequencies). The RFID tag contains electronically stored information which can be read from up to several meters away. Unlike a bar code, the RFID tag may be embedded in the tracked object or otherwise obscured.

RFID tags are used in many industries. For example, in the oil and gas industry, RFID tags are used to track assets used in downhole operations. However, conventional RFID tags are not designed for operations in harsh subterranean environments. Furthermore, conventional asset tracking methods may not be suitable for use in subterranean environments.

There is a need for an improved RFID tag that is suitable for tracking assets in subterranean environments.

SUMMARY

The present invention relates to rugged RFID tags. More particularly, the present invention relates ultra high frequency RFID tags for tracking assets and associated methods.

In one embodiment, the present disclosure provides a rugged UHF RFID tag comprising a UHF RFID tag, an overmolded peek cap, and a base, wherein the UHF RFID tag is secured to a top portion of the base and wherein the overmolded peek cap encapsulates the UHF RFID tag and the top portion of the base.

In another embodiment, the present disclosure provides an asset comprising a recessed feature and a rugged UHF RFID tag, wherein: the rugged UHF RFID tag comprises a retaining ring and the rugged UHF RFID tag is secured in the recessed feature via the retaining ring.

In another embodiment, the present disclosure provides a method of tracking assets, comprising: providing an asset with a recessed surface; providing a rugged UHF RFID tag, the rugged UHF RFID tag comprising a retaining ring; securing the rugged UHF RFID tag in the recessed surface; and scanning the rugged UHF RFID tag with an UHF reader.

The features and advantages of the present invention will be readily apparent to those skilled in the art. While numerous changes may be made by those skilled in the art, such changes are within the spirit of the invention.

BRIEF DESCRIPTION OF THE DRAWINGS

A more complete and thorough understanding of the present embodiments and advantages thereof may be acquired by referring to the following description taken in conjunction with the accompanying drawings.

DETAILED DESCRIPTION

Figure 1:
FIG. 1 is an illustration of a rugged UHF RFID tag in accordance with certain embodiments of this disclosure.

The present invention relates to rugged RFID tags. More particularly, the present invention relates ultra high frequency RFID tags for tracking assets and associated methods.

There may be several potential advantages of the rugged UHF RFID tags and methods disclosed herein. One of the many potential advantages of the rugged UHF RFID tags and methods disclosed herein is that they may allow for the tracking of assets in subterranean formations under conditions where conventional RFID tags would fail.

In certain embodiments, the rugged UHF RFID tags disclosed herein are designed to survive the harshest drilling and subsea environments. Certain embodiments of the rugged UHF RFID tags disclosed herein were engineered from inception specifically for oil and gas drilling operations. This revolutionary design stems from its core internal RFID circuitry and reinforced circuit board, customized enclosure and materials design, and its quick installation method. The rugged UHF RFID tags can be installed on various downhole components, such as drill pipe, HWDP, subs, drilling jars, and other components. Its design allows it to survive continuous exposure to corrosive elements, severe vibration, high pressures, and temperatures to 400° F. (~200° C.). Its antenna design and architecture allows accurate readings through accumulated sediments and thick drilling mud.

Other potential benefits of using the methods discussed herein are that they may provide for longer read ranges from mobile RFID readers and stationary antenna systems such as a rig antenna system, fast anti-collision when scanning multiple tags simultaneously, the use of UHF EPC Gen2 Technology, improved and robust IC architecture for the support of additional sensing capabilities, long lasting service life, and the elimination of battery requirements. Other potential benefits of using the methods disclosed herein include having a unique electronic identification of assets, eliminating the need for asset stenciling, allowing tracking of multiple assets in harsh conditions and environments, eliminating data entry or hand writing processes, improving the efficiency of maintenance, inspection, and business processes, providing cost effective and long lasting solutions to tracking needs, and eliminating the need for maintenance on the tags.

In one embodiment, the present disclosure provides an RFID tag. In certain embodiments, the RFID tag may be an ultra high frequency (UHF) RFID tag designed to operate at ultra high frequencies. The RFID tag may comprise a transceiver, a communication antenna, a data storage device, and a processor. In certain embodiments, the transceiver may be operable to transmit and receive data signals at a 915 MHz frequency band. In certain embodiments, the transceiver may be operable to transmit and receive data signals at a frequency band within a range of 865 MHz to 957 MHz. In certain embodiments, the communication antenna may be operatively connected to the transceiver. In certain embodiments, the data storage device may be operable to store data comprising identification data. In certain embodiments, the data processor may be operable to process data received from the transceiver and the data storage device and send data to cause the transceiver to emit an identification signal based up the identification data stored in the data storage device.

In certain embodiments, the RFID tag may be "ruggedized" to be capable of operating in subterranean environments. FIG. 1 is a photograph of a rugged UHF RFID tag in accordance with certain disclosed embodiments.

Figure 2:
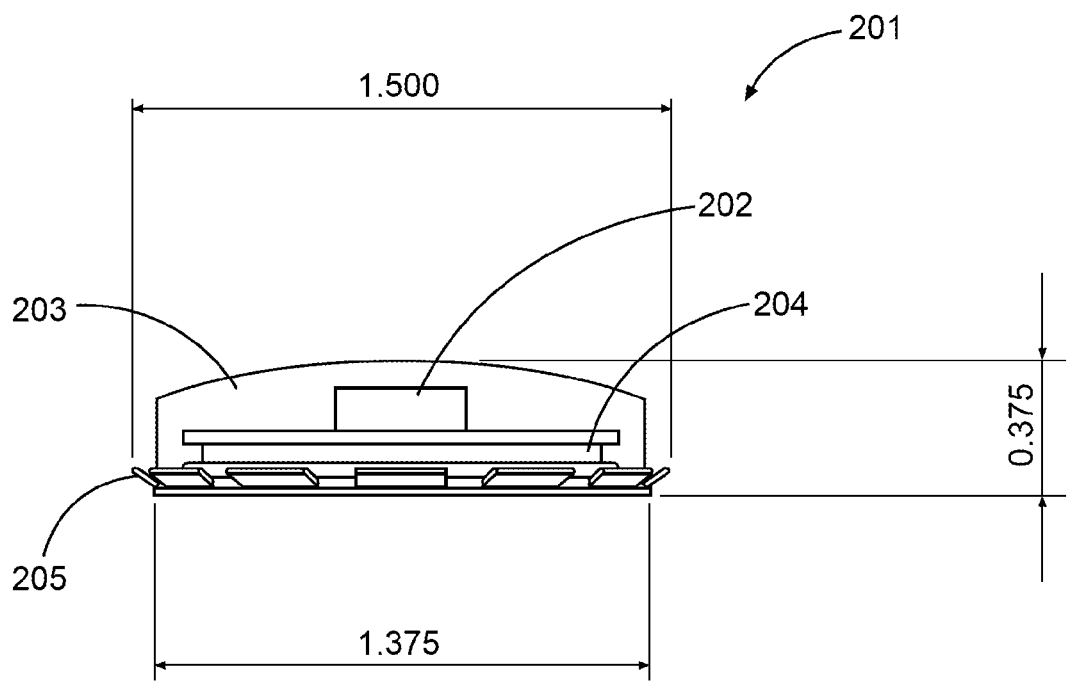
FIG. 2 is an illustration of a rugged UHF RFID tag in accordance with certain embodiments of this disclosure.

FIG. 2 is an illustration of a rugged UHF RFID tag 201. As can be seen in FIG. 2, the rugged UHF RFID tag 201 may comprise an RFID tag 202, a cap 203, and a base 204. The rugged UHF RFID tag 201 may also comprise a retaining ring 205. In certain embodiments, as shown in FIG. 2, the rugged UHF RFID tag 201 may have an overall thickness of 0.375 inches and an overall diameter of 1.5 inches. In certain embodiments, the rugged UHF RFID tag 201 may be up to 4 inches long and up to 0.5 inches thick, or even longer and/or thicker. In certain embodiments, the rugged UHF RFID tag 201 may be a drill insight tag.

In certain embodiments, as shown in FIG. 2, the base 204 may be circular shaped. In certain embodiments, the base 204 may have a diameter of 1.375 inches. In certain embodiments, the base 204 may be a metal base such as a steel base. In certain embodiments, the RFID tag 202 may be installed on top of the base 204. In certain embodiments, the base 204 may provide the RFID tag 202 a ground plane.

In certain embodiments, as shown in FIG. 2, the cap 203 may be installed over the RFID tag 202 and attached to the base 204, thus encapsulating the RFID tag 202. In certain embodiments, the cap 203 may comprise an overmolded cap. In certain embodiments, the cap 203 may comprise a plastic, a resin, or a ceramic. In certain embodiments, the overmolded cap may be a PEEK overmolded cap. The cap 203 may be any thickness that is sufficient to protect the UHF RFID tag 202. In certain embodiments, the encapsulated portion of the rugged UHF RFID tag 201 may be filled with an epoxy additive. In certain embodiments the encapsulated portion of the rugged UHF RFID tag 201 may be filled with E-40HT Hysol. In certain embodiments, the overmolded peek cap may provide protection to the RFID tag 202 allowing the RFID tag to operate at temperatures between −30° C. to 200° C. and pressures up to 10,000 psi or even up to 10,000 psi or higher. In certain embodiments, the overmolded peek cap may be chemically resistant, thus capable of protecting the RFID tag 202 from chemical corrosion.

In certain embodiments, as shown in FIG. 2, the rugged UHF RFID tag 201 may further comprise a retaining ring 205 attached to the base 204. In certain embodiments the retaining ring 205 may be pressed onto the base 204. In certain embodiments, the retaining ring 205 may be an internal lock ring. In certain embodiments, the internal lock ring may comprise a cantilevered spring that allows for flexure in only one direction. The retaining ring 205 may be made of a metal, for example steel. In certain embodiments, as shown in FIG. 2, the retaining ring 205 may be circular shaped. In certain embodiments, the retaining ring 205 may have a diameter of 1.5 inches. In other embodiments, the retaining ring 205 may be from 0.75 inches in diameter or 0.5 inches in diameter.

In certain embodiments, the rugged UHF RFID tag 201 may further comprise silicone potting on the end of the tag. In certain embodiments, the silicone potting may allow for shock protection of the RFID tag 202 caused by environmental conditions. The silicone potting may also compensate for various thermal expansion properties of the rugged UHF RFID tag 201. For example, due to downhole heat exposure, the steel in both the asset and the base 204 of the tag along with the retaining ring 205 may have some thermal expansion. In certain embodiments, the silicone potting may act as a buffer to maintain the expansion to a minimum and help with adhesion of the UHF RFID tag 202 to the base. In certain embodiments, the base 204 may be attached to the cap 203 using one or more screws to provide a mechanical interaction. The screws may be used in addition to an adhesive layer. Similarly, the retaining ring may be pressed onto the base 204 and attached through use of one or more screws and/or use of an adhesive layer.

In another embodiment, the present disclosure provides an asset comprising a rugged UHF RFID tag. The asset may be any asset used in subterranean formations. For example, in certain embodiments, the asset may be a tubular product, pump equipment, a bottom hole assembly, a blow out preventer, a riser, well head equipment, a break-out unit, or coil tubing equipment. In certain embodiments, the asset may comprise a recessed feature on its outside surface wherein the rugged UHF RFID tag may be attached.

Figure 3:
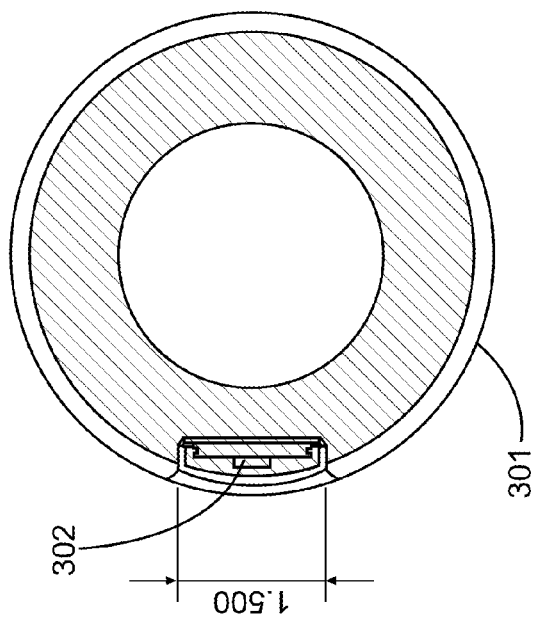
FIG. 3 is an illustration of two views of an asset comprising a rugged UHF RFID tag in accordance with certain embodiments of this disclosure.
Figure 3:
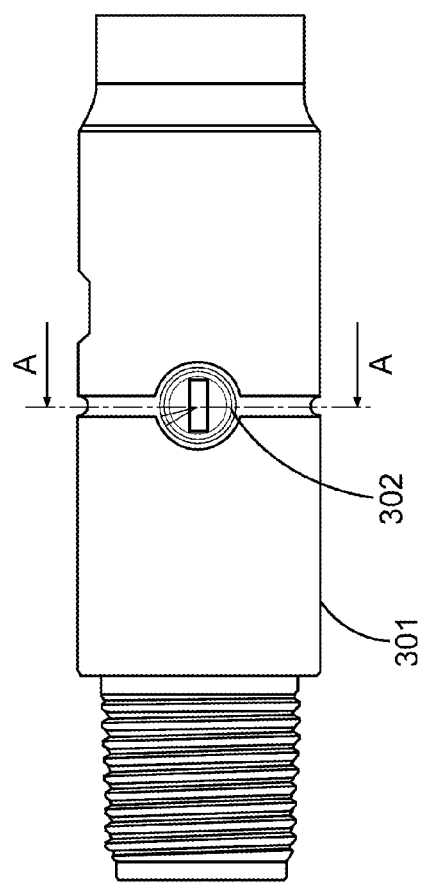
Figure 4:
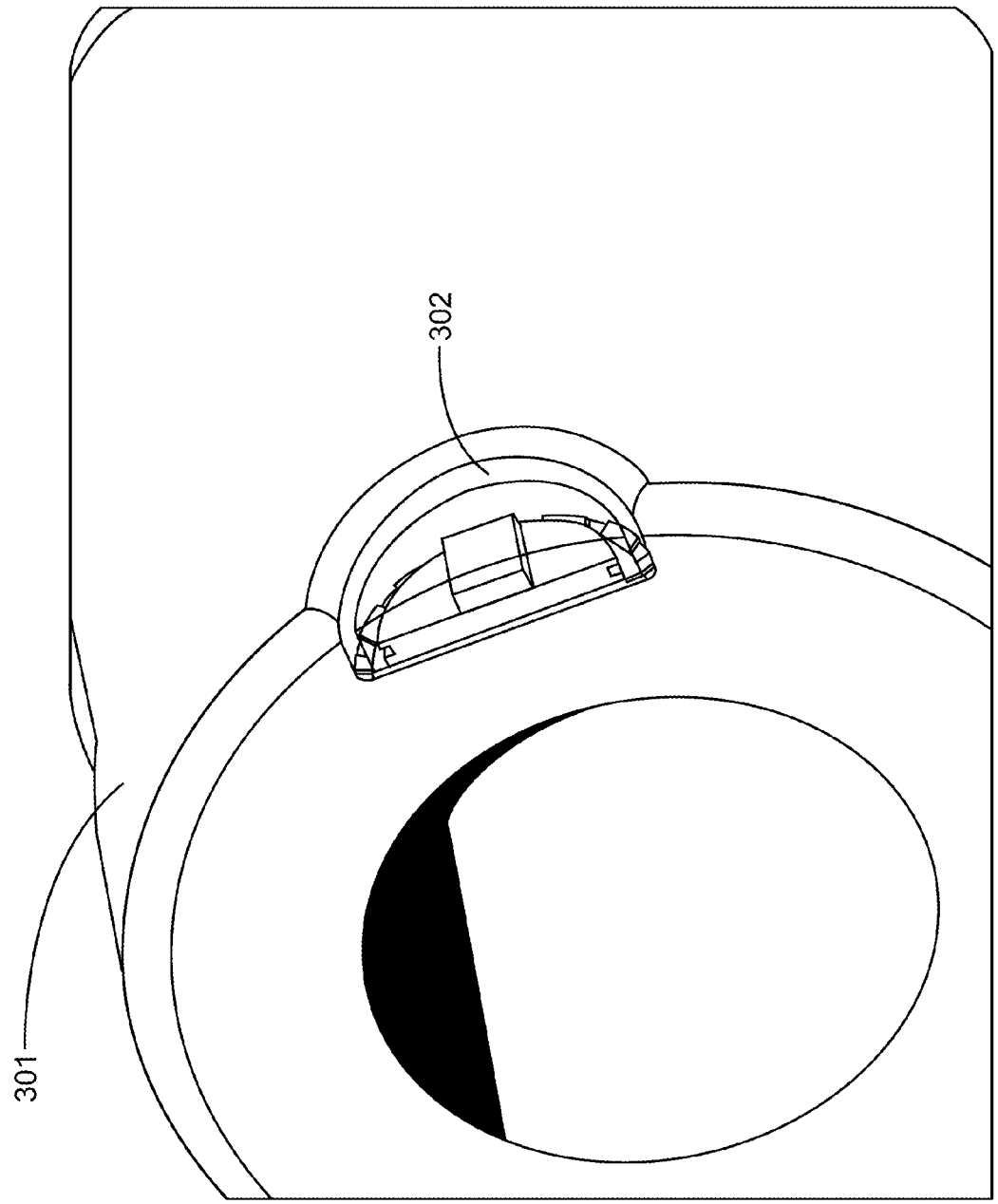
FIG. 4 is a partial illustration of an asset comprising a rugged UHF RFID tag in accordance with certain embodiments of this disclosure.

FIGS. 3 and 4 are illustrations of an asset 301 comprising a rugged UHF RFID tag 302. As can be seen in FIGS. 3 and 4, in certain embodiments, the rugged UHF RFID tag 302 may be placed in a recessed feature on the outside surface of the asset 301. In certain embodiments, the retaining ring may secure the rugged UHF RFID tag 302 to the asset 301. For example, in certain embodiments, the cantilevered springs of the retaining ring may be angled so that they will flex when the rugged UHF RFID tag 302 is placed in the recessed feature but do not allow for flexure in the opposite direction. In certain embodiments, the recessed feature may be filled with a protective material that partially or fully surrounds the rugged UHF RFID tag 302. In certain embodiments, the protective material may comprise a solidified epoxy.

In certain embodiments, the recessed feature on the outside surface of the asset 301 may be designed so that the rugged UHF RFID tag 302 does not protrude past an outside diameter of the asset 301 when installed in the recessed feature. In certain embodiments, the recessed feature on the outside surface of the asset 301 may be designed so that outside surface of rugged UHF RFID tag 302 is flush with an outside diameter of the asset 301 when installed in the recessed feature. In certain embodiments, the recessed feature on the outside surface of the asset 301 may be designed so that the rugged UHF RFID tag 302 does protrude past an outside diameter of the asset 301 when installed in the recessed feature. In certain embodiments, the rugged UHF RFID tag 302 may be strategically placed at a depth where it will become a visual indicator for wear of a product.

In certain embodiments, the present disclosure provides a UHF RFID tag reader. In some embodiments, the UHF RFID tag reader may comprise an undercarriage reader located underneath a drilling rig. The undercarriage reader may provide the ability to read the UHF RFID tags as they pass through the floor of the drill rig during drilling operations. In certain embodiments, the tag reader may be operable to transmit and receive data signals at a 915 MHz frequency band. In certain embodiments, the tag reader may be operable to transmit and receive data signals at a frequency band within a range of 865 MHz to 957 MHz.

In certain embodiments, the UHF RFID tag reader may comprise a plurality of communication antenna operatively connected to the UHF RFID tag reader. For example, in certain embodiments, the UHF RFID tag reader may comprise three communication antennas. In certain embodiments, for example when the UHF RFID tag reader comprises three communication antennas, each of them may be placed within a radius of one meter from the center of the drilling pipes at intervals of 120°. In certain embodiments, the UHF RFID tag reader may be placed at a long stand off range.

In certain embodiments, the UHF RFID tag reader may be capable of operating in an explosive atmosphere. For example, in certain embodiments, the antenna may connect to the UHF RFID tag reader through an Explosion Proof Antenna Coupler (EPAC). The EPAC may allow the installation of ordinary passive antennas in hazardous locations by integrating a blocking circuit that prevents potentially hazardous energies from reaching the antenna. In certain embodiments, the UHF RFID tag reader may utilize remote antenna.

In certain embodiments, the UHF RFID tag reader may communicate with a computer network via fiber optics. The fiber optics connection may electrically insolate the reader from the computer network therefore making it robust to current or voltage spikes. In certain embodiments, UHF RFID tag reader may be powered using a power supply that has been certified as UL/C-UL Listed UL 1605 Class I, Division 2, Groups A, B, C, and D.

Figure 5:
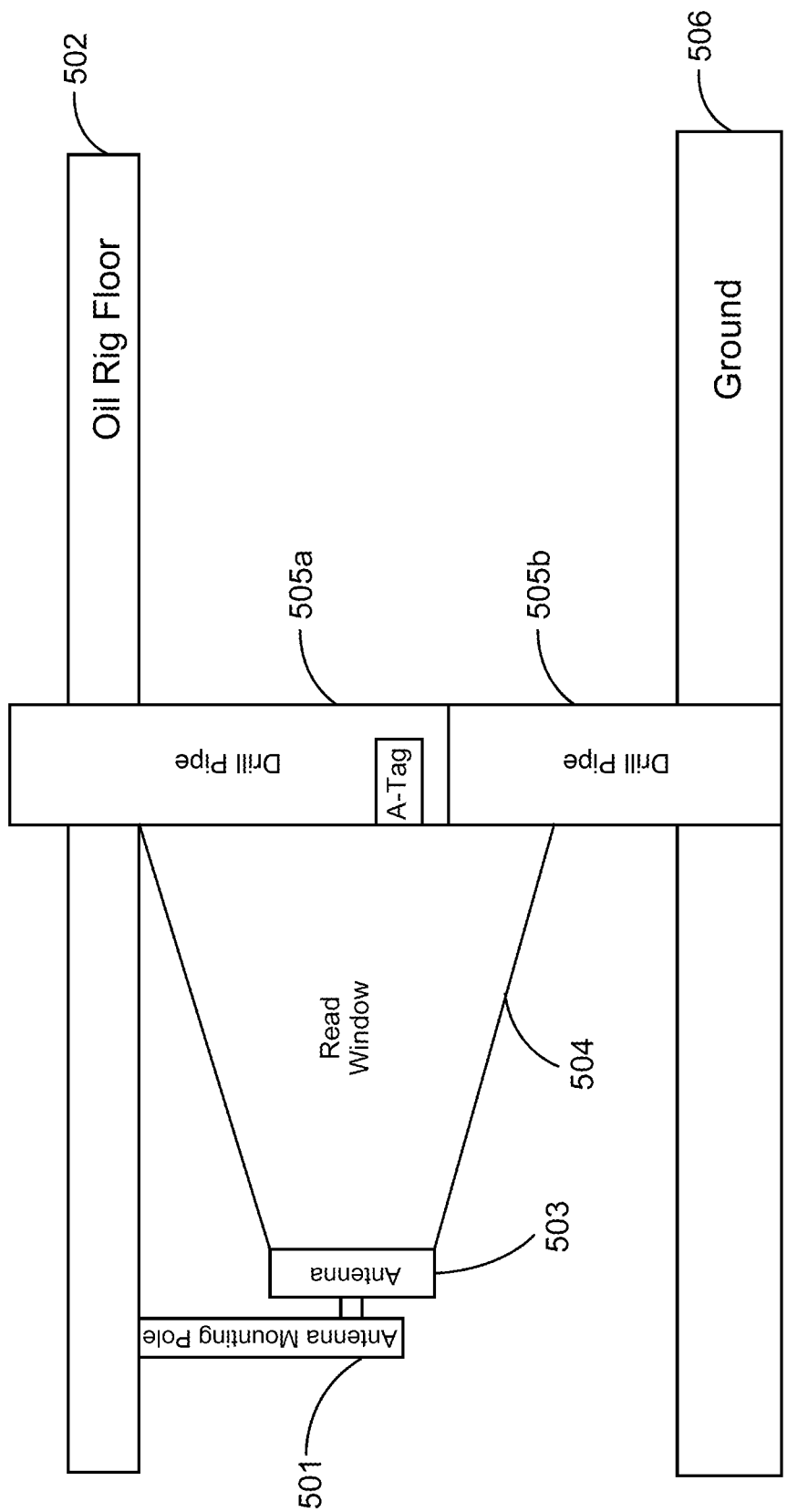
FIG. 5 is an illustration of an antenna installation scheme in accordance with certain embodiments of the present disclosure.

FIG. 5 illustrates an antenna installation scheme. As can be seen by FIG. 5, an antenna mounting pole 501 may be attached to the underside of an oil rig floor 502. An antenna 503 may be attached to the antenna mounting pole 501. The antenna 503 may provide a read window 504 in which any tagged asset, such as tagged asset 505a or tagged asset 505b traveling down the path of the drill pipe may be scanned and read by the antenna 503 before it passes into the ground 506. Although not pictured in FIG. 5, a plurality of antenna mounting poles and antennas may be used to provide a read window that is capable of reading any tagged asset that passes through the path of the drill pipe with or without regard to the tagged assets orientation.

Figure 6:
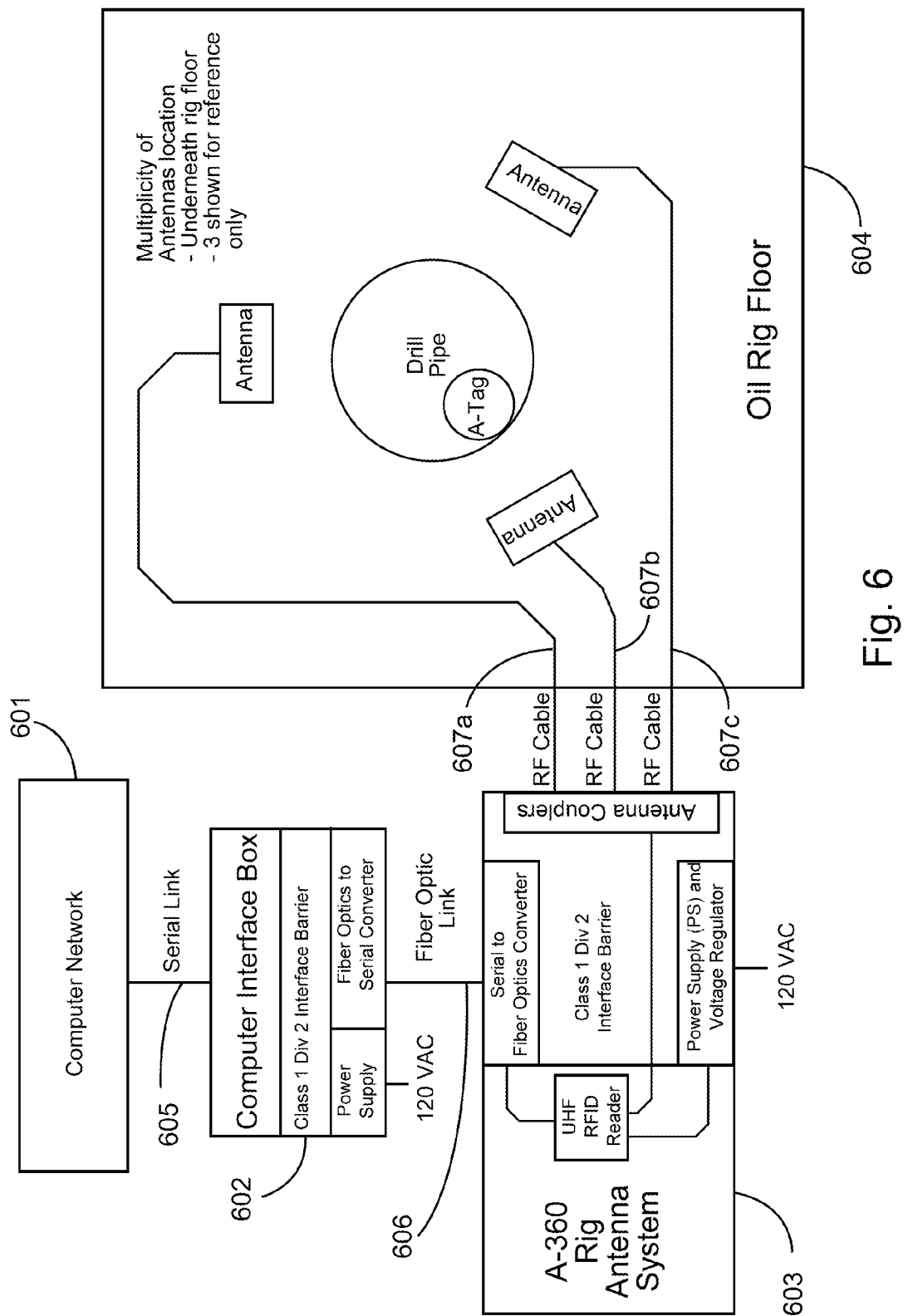
FIG. 6 is a block diagram of an asset management tracking system in accordance with certain embodiments of this disclosure.

FIG. 6 illustrates a block diagram of an asset management tracking system in accordance to certain embodiments of the present disclosure. As shown in FIG. 6, the asset management tracking system may comprise a computer network 601, a computer interface box 602, a rig antenna system 603, and an oil rig floor 604. The computer network 601 may be coupled to the computer interface box 602 via serial link 605. The computer interface box 602 may be coupled to the rig antenna system 603 via fiber optic link 606. The rig antenna system 603 may be coupled to antennas located under the oil rig floor 604 by one or more RF cables 607a, 607b, and 607c.

Figure 7:
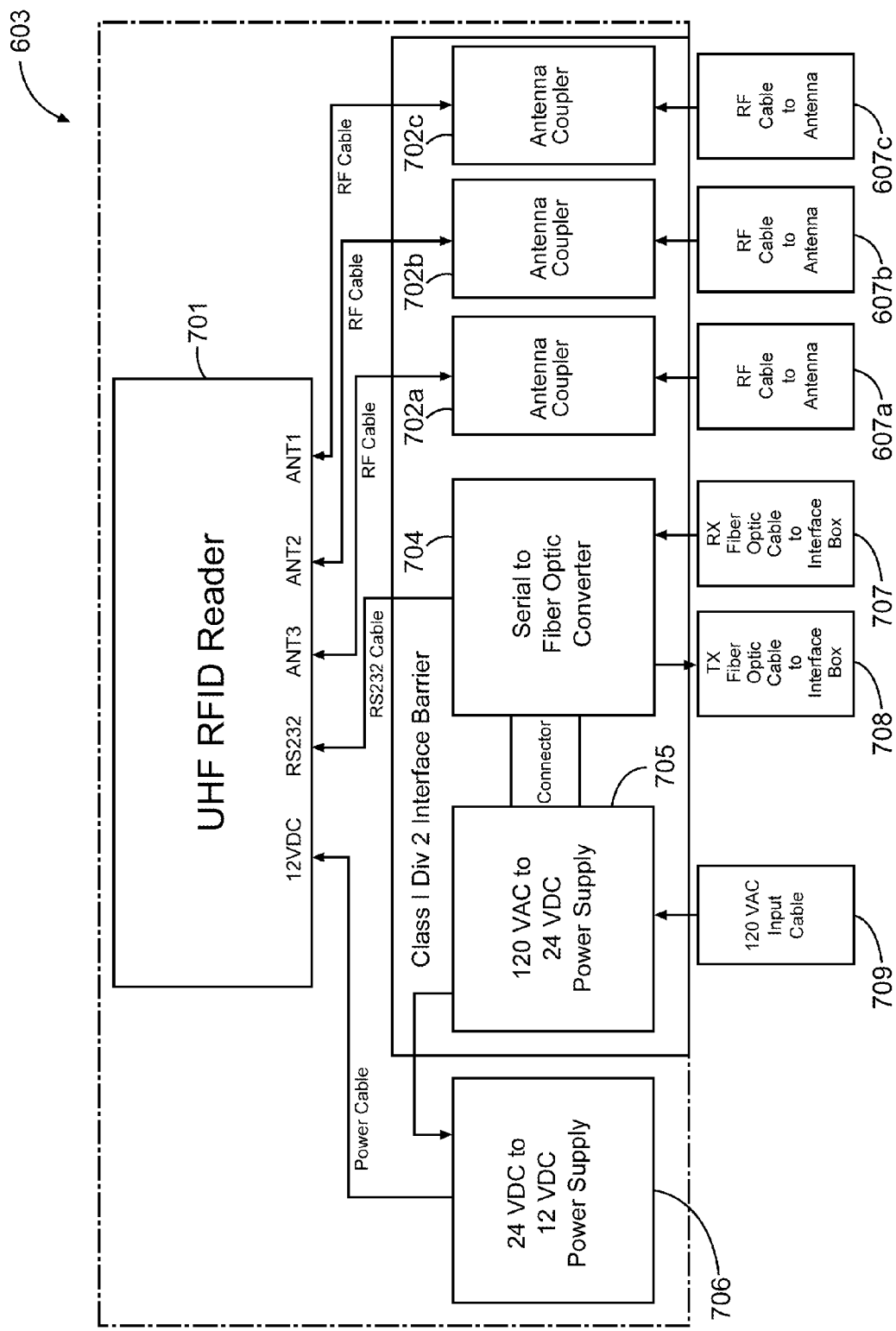
FIG. 7 is an illustration of a block diagram of tag reader in accordance with certain embodiments of the present disclosure.

FIG. 7 illustrates a block diagram of the rig antenna system 603 of FIG. 6. The rig antenna system 603 may comprise a UHF RFID reader 701 coupled to one or more antenna coupler units 702a, 702b, and 702c that form part of interface barrier 703 via one or more RF cables. Antenna coupler units 702a, 702b, and 702c may then be connected via RF cables 607a, 607b, and 607c to one or more antennas. Rig antenna system 603 may further comprise a serial to fiber optic converter 704 for converting fiber optic signals received over Rx fiber optic cable to interface box 707 to serial data transmissions and for converting serial data to signals for fiber optic transmission via Tx fiber optic cable to interface box 708. Serial to fiber optic converter 704 may be connected to UHF RFID reader 701 via a serial cable, such as a RS232 cable used for serial data communication. Rig antenna system 603 may further comprise a power supply 705 that supplies power to the serial to fiber optic converter 704. As shown in FIG. 7, power supply 705 converts 120 volts of alternating current received via input cable 709 to 24 volts of direct current. Power supply 705 may also supply power to UHF RFID reader 701 either directly or by use of a second power supply 706 that converts 24 volts direct current to 12 volts direct current. The output voltage may be scaled to the proper voltage required by the UHF RFID reader 701.

Figure 8:
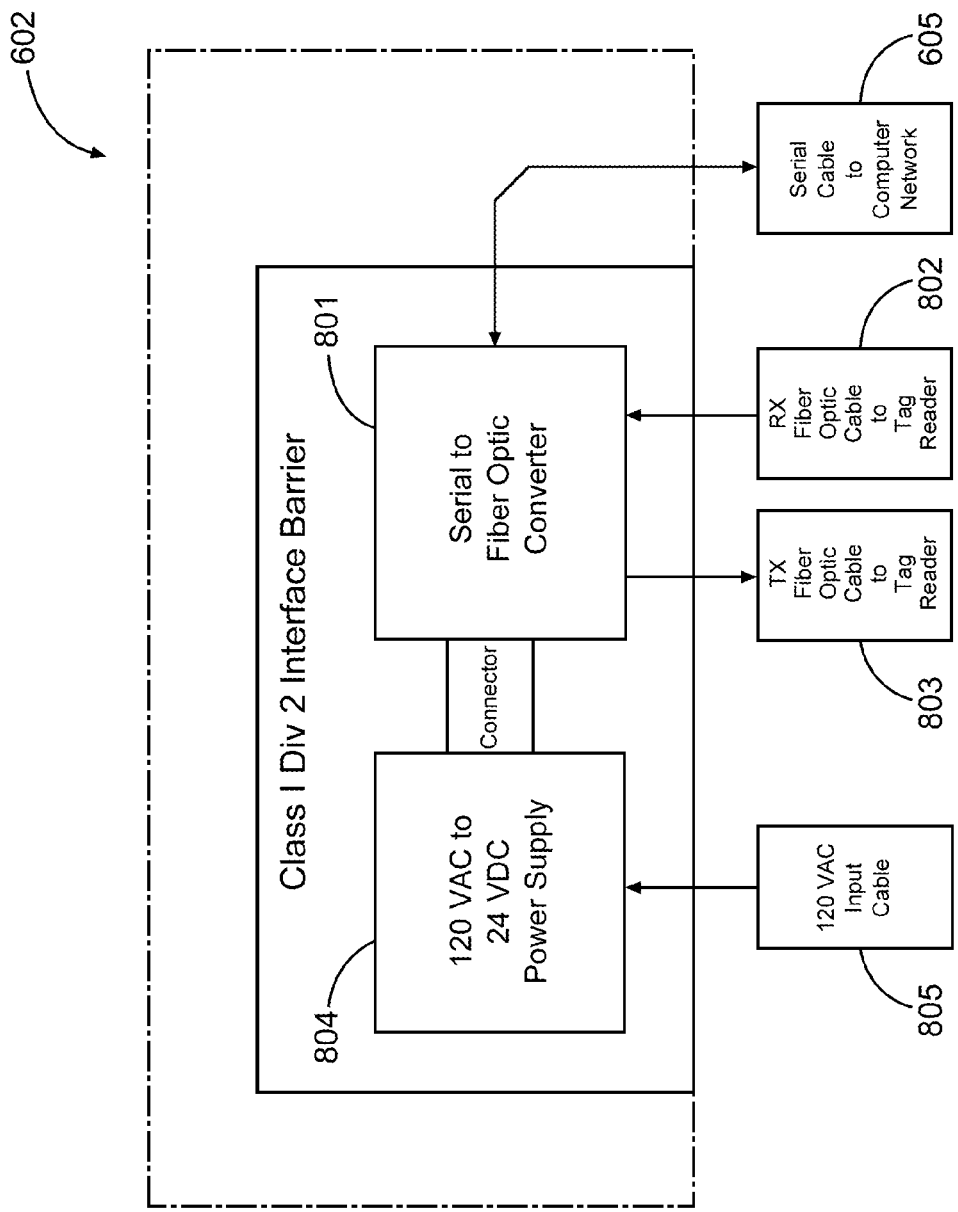
FIG. 8 is an illustration of a block diagram of a computer interface box in accordance with certain embodiments of the present disclosure.

FIG. 8 illustrates a block diagram of the computer interface box 602 of FIG. 6. As shown in FIG. 8, the computer interface box 602 may comprise a serial to fiber optic converter 801 for converting signals received over fiber optic cables to serial data transmissions. As shown in FIG. 8, the serial to fiber optic converter 801 may receive signals over Rx fiber optic cable to tag reader 802. Serial to fiber optic converter 801 may also transmit signals over Tx fiber optic cable to tag reader 803. As shown in FIG. 8, serial to fiber optic converter 801 may communicate with the computer network 601 of FIG. 6 via the serial link 605 of FIG. 6. The serial to fiber optic converter 801 may be connected to a power supply 804 that receives a supply voltage via input cable 805.

Figure 9:
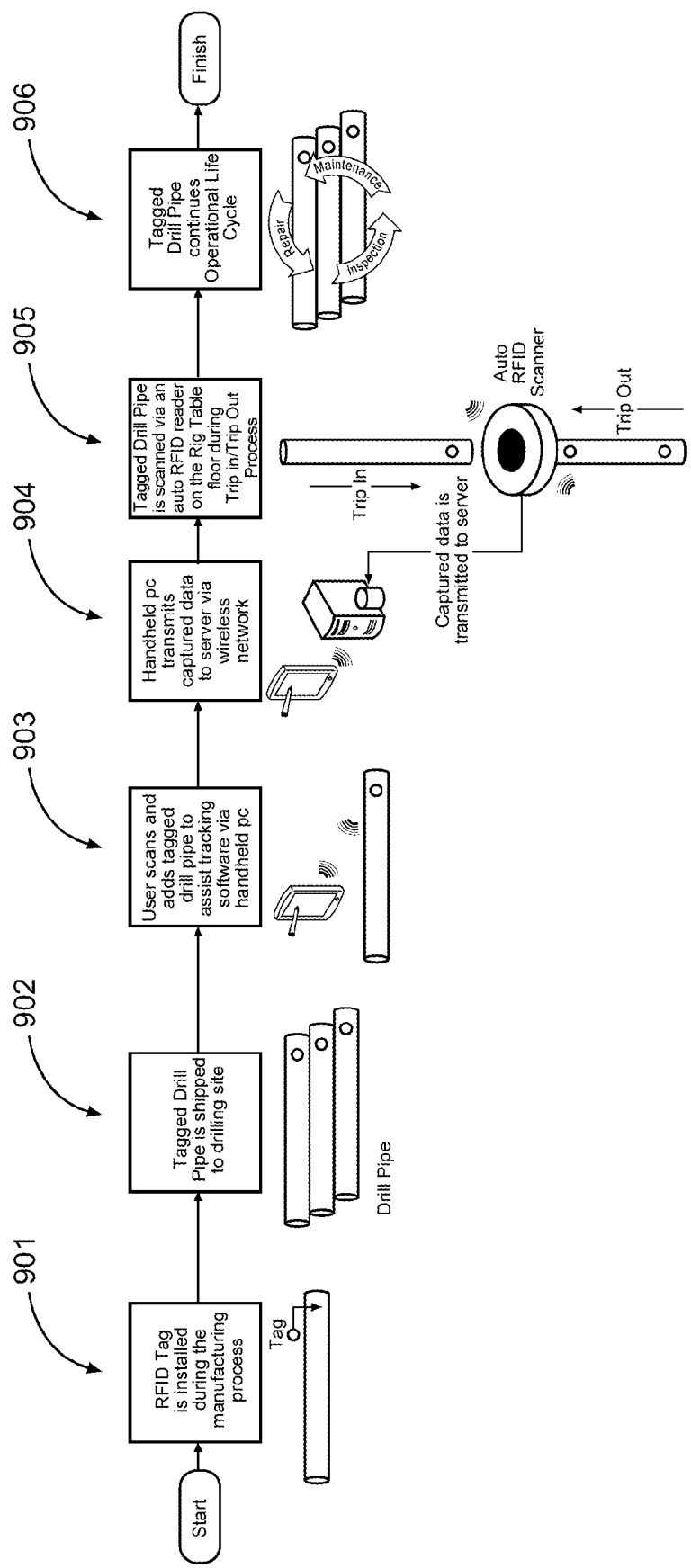
FIG. 9 is an illustration of an asset management tracking system in accordance with certain embodiments of this disclosure.

FIG. 9 illustrates a method of tracking an asset in accordance with certain embodiments of the present disclosure. As shown in FIG. 9, at Step 901, a rugged UHF RFID tag may be installed on an asset, such as a drill pipe, to form a tagged asset. The tag may uniquely identify each drill pipe and therefore making it easier to track drill pipes usage in harsh environments. At Step 902, The tagged asset may then be shipped to a drilling site where a user may scan the tagged asset with a handheld device. For example, the UHF RFID tag may be scanned using a ruggedized handheld PC with a Bluetooth HF RFID reader. At Step 903, the RFID reader may scan and identify the unique number embedded onto each RFID tag and process the number on its software. At Step 904, the software on the handheld PC may then search for this unique number in the database and display the asset's information on the handheld PC screen. The handheld device also transmits the captured data to a server via a wireless network.

At Step 905, the tagged asset may then be scanned using a fixed HF RFID reader, such as an undercarriage reader, placed under the rig table floor. The undercarriage reader may provide the ability to read the tags as they pass through the floor of the drill rig during drilling operations. In certain embodiments, the tracking system may work by having the undercarriage reader generate a 915 MHz signal that completely surrounds the asset. As the asset passes vertically through the rig table floor's opening, it may be scanned by fixed HF RFID reader, which in turn may identify the unique number and transmit data to a rig server via a wireless communication link and/or to the handheld PC. The asset's information may then be displayed on a standard PC's display. The PC device may then transmit the captured data to a server via a wireless network. Thus, the life cycle of and usage of a tagged asset may easily be monitored allowing the tagged asset to continue its operational life cycle a shown at Step 906.

Figure 10:
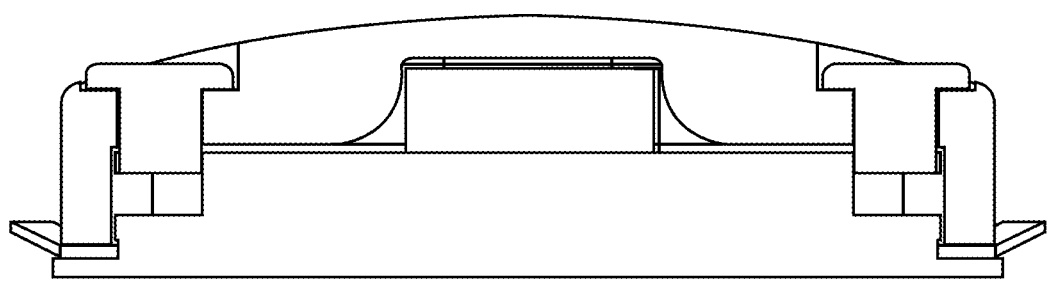
FIG. 10 is an illustration of a rugged UHF RFID tag in accordance with certain embodiments of this disclosure.
Figure 11:
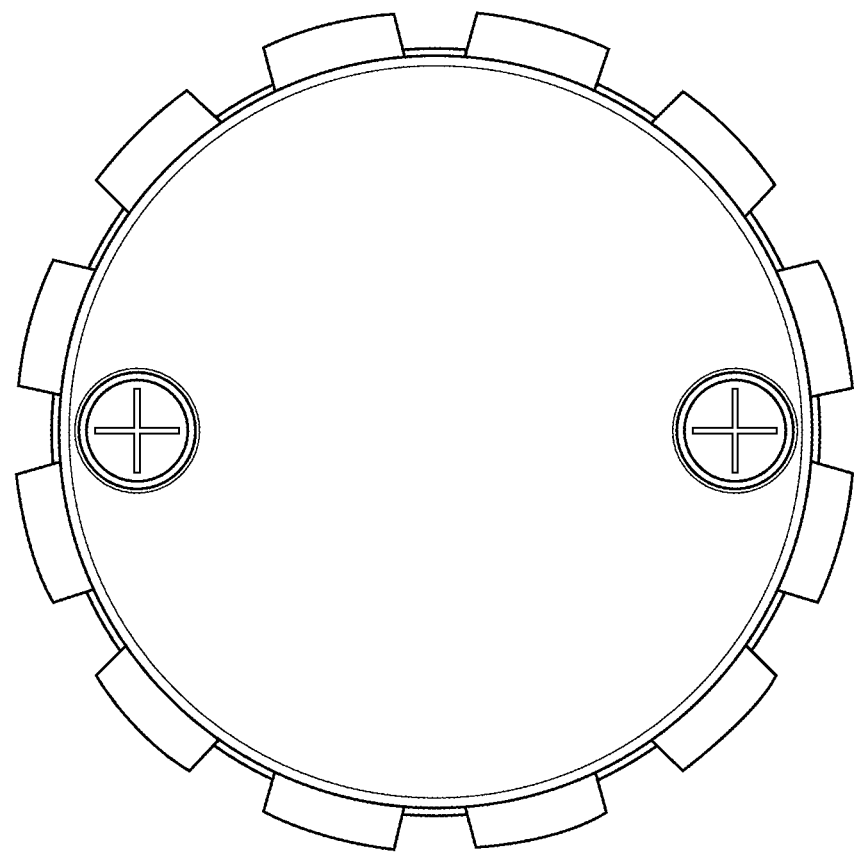
FIG. 11 is an illustration of a rugged UHF RFID tag in accordance with certain embodiments of this disclosure.

FIG. 10 illustrates one embodiment of a rugged RFID tag in accordance with the disclosed invention from a side view. FIG. 11 illustrates one embodiment of a rugged RFID tag in accordance with the disclosed invention from a top down view.

Although the present invention and its advantages have been described in detail, it should be understood that various changes, substitutions and alternations can be made herein without departing from the spirit and scope of the invention as defined by the following claims.

What is claimed is:

1. A rugged UHF RFID tag, comprising:
a UHF RFID tag;
an overmolded cap;
a base, wherein the UHF RFID tag is secured to a top portion of the base and wherein the overmolded cap encapsulates the UHF RFID tag and the top portion of the base; and
a retaining lock ring, wherein the retaining lock ring is attached to the base, and the retaining lock ring includes a cantilevered spring that allows for flexure in only one direction.

2. The rugged UHF RFID tag of claim 1, wherein the UHF RFID tag is a drill insight tag.

3. The rugged UHF RFID tag of claim 1, further comprising an encapsulated portion formed between the overmolded cap and the UHF RFID tag, wherein the encapsulated portion is filled with a fill material.

4. The rugged UHF RFID tag of claim 1, further comprising silicone potting between the UHF RFID tag and the base.

5. The rugged UHF RFID tag of claim 1, wherein the base is connected to the overmolded cap by use of one or more screws.

6. The rugged UHF RFID tag of claim 1, wherein the retaining lock ring is attached to the base by use of one or more screws.

7. The rugged UHF RFID tag of claim 1, wherein the cantilevered spring of the retaining lock ring is a plate that is angled between an inner end of the plate and an outer end of the plate, the outer end of the plate being a free end that is located above the inner end of the plate.

8. The rugged UHF RFID tag of claim 1, wherein the retaining lock ring includes a plurality of cantilevered springs spaced apart from one another around the retaining lock ring.

9. An asset comprising:
a recessed feature; and
a rugged UHF RFID tag, wherein
the rugged UHF RFID tag comprises a retaining lock ring and wherein the rugged UHF RFID tag is secured in the recessed feature via the retaining lock ring,
the retaining lock ring including a cantilevered spring that allows for flexure in only one direction, the cantilevered spring being angled so that the cantilevered spring flexes in the one direction when the rugged UHF RFID tag is placed in the recessed feature but the cantilevered spring does not allow for flexure in an opposite direction to the one direction.

10. The asset of claim 9, wherein the rugged UHF RFID tag comprises a drill insight tag.

11. The asset of claim 9, wherein the rugged UHF RFID tag comprises an overmolded cap and an encapsulated portion formed under the overmolded cap, and wherein the encapsulated portion is filled with a fill material.

12. The asset of claim 9, wherein the recessed feature comprises a protective material that at least partially surrounds the rugged UHF RFID tag.

13. The asset of claim 9, wherein the asset further comprises an outside diameter, and wherein the rugged UHF RFID tag comprises an outside surface, and wherein the outside surface of the rugged UHF RFID tag is flush with the outside diameter of the asset.

14. A method of tracking assets, comprising:
providing an asset with a recessed surface;
providing a rugged UHF RFID tag, the rugged UHF RFID tag comprising a retaining lock ring, the retaining lock ring including a cantilevered spring that allows for flexure in only one direction, the cantilevered spring being angled so that the cantilevered spring flexes in the one direction when the rugged UHF RFID tag is placed in the recessed surface but the cantilevered spring does not allow for flexure in an opposite direction to the one direction;
securing the rugged UHF RFID tag in the recessed surface, and the securing the rugged UHF RFID tag in the recessed surface includes flexing the cantilevered spring; and
scanning the rugged UHF RFID tag with a UHF reader.

15. The method of claim 14, wherein the UHF RFID tag comprises a drill insight tag.

16. The method of claim 14, further comprising at least partially surrounding the UHF RFID tag with a protective material.

17. The method of claim 14, wherein the UHF reader comprises a plurality of antennas.

18. The method of claim 14, wherein the UHF reader comprises an undercarriage reader located underneath a drilling rig floor.

19. The method of claim 18, wherein the scanning the rugged RFID tag with the UHF reader comprises passing the asset through a hole in the drilling rig floor.

* * * * *